(12) United States Patent
Livitz et al.

(10) Patent No.: US 12,020,505 B1
(45) Date of Patent: Jun. 25, 2024

(54) SYSTEM AND METHOD FOR FACIAL RECOGNITION ACCURACY

(71) Applicant: Wicket, LLC, Cambridge, MA (US)

(72) Inventors: Gennady Livitz, Doylestown, PA (US); Patrick Quinlan, Doylestown, PA (US); Samson Timoner, Doylestown, PA (US)

(73) Assignee: Wicket, LLC, Las Vegas, NV (US)

( * ) Notice: Subject to any disclaimer, the term of this patent is extended or adjusted under 35 U.S.C. 154(b) by 257 days.

(21) Appl. No.: 17/472,962

(22) Filed: Sep. 13, 2021

Related U.S. Application Data

(63) Continuation-in-part of application No. 17/195,803, filed on Mar. 9, 2021, now Pat. No. 11,495,052, and a continuation of application No. 16/679,021, filed on Nov. 8, 2019, now Pat. No. 11,132,532, which is a continuation of application No. 16/409,422, filed on May 10, 2019, now Pat. No. 11,010,597.

(60) Provisional application No. 62/758,268, filed on Nov. 9, 2018, provisional application No. 62/669,698, filed on May 10, 2018.

(51) Int. Cl.
*G06V 40/16* (2022.01)
*G06F 16/783* (2019.01)
*G06V 10/32* (2022.01)

(52) U.S. Cl.
CPC .......... *G06V 40/172* (2022.01); *G06F 16/784* (2019.01); *G06V 40/167* (2022.01); *G06V 10/32* (2022.01)

(58) Field of Classification Search
CPC .... G06V 40/172; G06V 40/167; G06V 10/32; G06F 16/784
See application file for complete search history.

(56) References Cited

U.S. PATENT DOCUMENTS

| | | |
|---|---|---|
| 6,792,618 B1 | 9/2004 | Bendinelli et al. |
| 7,403,920 B2 | 7/2008 | Nishikiori et al. |
| 8,154,615 B2 | 4/2012 | Fedorovskaya et al. |
| 8,448,056 B2 | 5/2013 | Pulsipher et al. |

(Continued)

OTHER PUBLICATIONS

U.S. Appl. No. 16/409,422, U.S. Pat. No. 11/010,597, filed May 10, 2019.

(Continued)

*Primary Examiner* — Casey L Kretzer
(74) *Attorney, Agent, or Firm* — David J. Powsner; Davis Malm D'Agostine PC

(57) ABSTRACT

The invention provides, in some respects, a digital data processing method of identifying a person of interest in a video stream. The method, which executes on a digital data processing system including one or more digital data processing devices in communications coupling with one another, includes detecting using a detector and without using a facial recognizer one or more faces in a video stream. It further includes using a tracker to associate, without using a facial recognizer, one or more of the detected faces with a same apparent individual, and scoring, again, without using a facial recognizer, each of the detected faces that are associated with the same apparent individual. The method further includes applying selected ones of the scored detected faces of the same apparent individual to a facial recognizer to identify a person of interest, where selection is based on scores of the detected faces.

22 Claims, 4 Drawing Sheets

Facial Recognition Pipeline

(56) References Cited

U.S. PATENT DOCUMENTS

| | | | |
|---|---|---|---|
| 8,913,103 B1* | 12/2014 | Sargin | G06V 40/16 348/14.12 |
| 9,412,180 B2 | 8/2016 | Ono et al. | |
| 9,672,535 B2 | 6/2017 | Higgins | |
| 9,691,074 B2 | 6/2017 | Fan et al. | |
| 11,132,532 B1* | 9/2021 | Livitz | G06V 20/52 |
| 2006/0044446 A1 | 3/2006 | Porter et al. | |
| 2007/0230799 A1* | 10/2007 | Shniberg | G06F 16/532 707/E17.03 |
| 2009/0080715 A1 | 3/2009 | van Beek et al. | |
| 2013/0236072 A1 | 4/2013 | Sun | |
| 2014/0044348 A1* | 2/2014 | Chen | G06V 40/16 382/159 |
| 2014/0337066 A1 | 7/2014 | Kephart | |
| 2016/0063316 A1 | 3/2016 | Lee et al. | |
| 2016/0086015 A1 | 3/2016 | Irmatov et al. | |
| 2016/0171346 A1 | 6/2016 | Han et al. | |
| 2016/0350334 A1 | 12/2016 | Bataller et al. | |
| 2016/0350587 A1* | 12/2016 | Bataller | G06T 7/292 |
| 2017/0300744 A1* | 10/2017 | Ju | G06V 40/168 |
| 2018/0027272 A1 | 1/2018 | Raj et al. | |
| 2018/0032796 A1 | 2/2018 | Kuharenko et al. | |
| 2019/0005310 A1 | 1/2019 | Kim | |
| 2019/0130167 A1 | 5/2019 | Ng et al. | |
| 2020/0257889 A1 | 8/2020 | Merkel et al. | |

OTHER PUBLICATIONS

U.S. Appl. No. 16/678,681, filed Nov. 8, 2019.
U.S. Appl. No. 16/679,021, U.S. Pat. No. 11/132,532, filed Nov. 8, 2019.
U.S. Appl. No. 16/880,467, U.S. Pat. No. 11/151,390, filed May 21, 2020.
U.S. Appl. No. 63/016,957, filed Apr. 28, 2020.
U.S. Appl. No. 63/185,262, filed May 6, 2021.
U.S. Appl. No. 17/195,803, filed Mar. 9, 2021.
U.S. Appl. No. 17/241,223, filed Apr. 27, 2021.

* cited by examiner

SYSTEM AND METHOD FOR FACIAL RECOGNITION ACCURACY

REFERENCE TO RELATED APPLICATIONS

This application is a continuation of U.S. patent application Ser. No. 16/679,021, filed Nov. 8, 2019, which claims the benefit of filing of U.S. Provisional Patent Application Ser. No. 62/758,268, filed Nov. 9, 2018, both of which are entitled SYSTEM AND METHOD FOR FACIAL RECOGNITION ACCURACY.

This application is also a continuation in part of commonly assigned Ser. No. 17/195,803, filed Mar. 9, 2021, entitled DIGITAL DATA SYSTEMS AND METHODS USING FACIAL RECOGNITION, which is a continuation of U.S. patent application Ser. No. 16/409,422, filed May 10, 2019, now U.S. Pat. No. 11,010,597, issued May 18, 2021, entitled DIGITAL DATA SYSTEMS AND METHODS USING FACIAL RECOGNITION, which claims the benefit of filing of U.S. Provisional Patent Application 62/669,698, filed May 10, 2018.

The teachings of all of the foregoing applications are incorporated herein by reference.

BACKGROUND OF THE INVENTION

The Invention relates to digital data processing, digital image analysis, facial recognition, and/or computer-mediated security systems. The invention has application, by way of non-limiting example, in security systems for public events and/or venues.

A problem for home- and business-owners, alike, is determining whom to permit to enter premises and whom to exclude. Police, private security details and others have a related problem: quickly detecting persons that are not desirable at sporting events, concerts, or other events and/or at company facilities, military bases or sporting stadiums or other venues.

Facial Recognition is the computer-based, automated process of identifying people from images of them acquired using one or more cameras. Reliably detecting and recognizing faces can be challenging for a number of reasons, including, but not limited to, noisy camera sensors, inappropriate exposure times, non-uniform or inadequate illumination, blur from motion and so forth.

It can also be challenging as a result of a poorly architected, underpowered or otherwise imperfect computer-based facial recognition system. Issues in these regards can result, for example, from the Deep Neural Network or other function used by such a system to map an image of a face to a vector of numbers and, thereby, to classify that face as belonging to a particular person. Ideally and to that end, a facial recognition system would map all images of the same person to a single vector. In practice, that proves hard to achieve, in part, on account of poor video image acquisition and, in part, on account of imperfections in the neural network or other computer-based function employed by the recognition system.

An object of the invention is to provide improved systems, apparatus and methods for digital data processing, digital image analysis, facial recognition, and/or computer-mediated security. A further object to provide such systems, apparatus and methods as are suitable for facial recognition and, more particularly, achieving facial recognition with accuracy. A still further object of the invention is to provide such systems, apparatus and methods as are suitable for use in homes, business, and other public and private events.

SUMMARY OF THE INVENTION

The aforementioned and other objects are attained by the invention which provides, in some aspects, improved systems and methods for facial recognition that overcome ill-effects of noise, illumination and/or motion blur, as well as those resulting from the limitations of the computer-based recognition functions of the digital data processing apparatus on which such systems and methods are implemented.

Thus, the invention provides in some aspects a digital data processing method of identifying a person of interest in a video stream. The method, which executes on a digital data processing system including one or more digital data processing devices in communications coupling with one another, includes detecting using a detector (such as by way of non-limiting example a facial detector)—and without using a facial recognizer—one or more faces in a video stream. It further includes using a tracker to associate—again, without using a facial recognizer—one or more of the detected faces with a same apparent individual, and scoring (also, without using a facial recognizer) each of the detected faces that are associated with the same apparent individual. The method further includes applying selected ones of the scored detected faces of the same apparent individual to a facial recognizer to identify a person of interest, where selection is based on the respective scores of the detected faces.

Further aspects of the invention provide a method, e.g., as described above, that includes executing on the digital data processing system a step of adjusting a threshold associated with the facial recognizer as a function of the number of selected images applied to that recognizer.

Still further aspects of the invention provide a method, e.g., as described above, that foregoes applying to the recognizer scored detected faces whose scores fall below a threshold.

Yet still further aspects of the invention provide a method, e.g., as described above, that includes a step of monitoring over a continuous interval of time scores of scored detected faces associated with the same apparent individual.

Other aspects of the invention provide a method, e.g., as described above, that includes applying to the facial recognizer one or more of the scored detected faces being monitored, if their scores fail to increase within a specified period of time. In related aspects of the invention, such a method contemplates applying to the facial recognizer one or more of the scored detected faces, if after the specified period of time their scores increase.

Still yet other aspects of the invention provide a method, e.g., as described above, that includes detecting, using the detector and without using a facial recognizer, a face of a first individual in a first video frame of the video stream, and using the tracker to track, in multiple frames of the video stream, faces apparently associated with the first individual.

Related aspects of the invention provide such a method comprising executing on the digital data processing system the step of selecting with a selector function faces in the multiple frames apparently associated with the first individual and applying those selected faces to a facial classifier.

Still other aspects of the invention provide a method, e.g., as described above, including using an embedder to map each face selected in the selecting step to a vector of numbers, and using the vectors of numbers in the facial classifier to identify the first individual.

Advantages of systems and methods as described above include that they permit the tracking and/or identification of individuals who appear in video streams without incurring the cost (in time and/or resources) of multiple invocations of facial recognizer functionality—relying, instead on detector and trackers, which typically consumer fewer such resources and are faster.

Other aspects of the invention provide systems that execute methods, e.g., as described above, on one or more digital data processors (including, for example, CPUs and GPUs). Such systems can include or be coupled to a combination of cameras, edge processing devices, and servers that are in communications coupling (e.g., via a network) to recognize persons of interest (POI) and interdict and prevent them from entering, traversing, and/or attending (collectively, "entering") venues or events. Such systems can gainfully employ a tracker, e.g., as described above, that is responsible for tracking each face from frame to frame in the video stream generated by the cameras, recognizing the face as belonging to a same individual recognized from a previous frame or to an individual new to the video stream. The tracker produces a collection of images of each unique individual's face taken over one or more frames.

Further aspects of the invention provide a system, e.g., as described above, wherein each camera is connected to an edge computing device (ECD) to keep a local listing (or database) of the one or more POI listings and to take a continuous stream of video coming from the camera connected to the ECD and start processing it and matching against the POI.

Further aspects of the invention provide a system, e.g., as described above, wherein multiple streams of video are taken from multiple cameras; wherein there is a one-to-one mapping of a camera to an ECD; and wherein multiple software modules are running on the ECD which together form the processing unit for facial detection.

Further aspects of the invention provide a system, e.g., as described above, wherein a detector is tasked with detecting a particular image, such as a face, the detector takes each frame of the video stream and with algorithms it is loaded with, will detect all faces in the frame, will mark each face in a particular way, will also give each face a unique ID or faceID, and/or will isolate the face image from the rest of the frame.

Further aspects of the invention provide a system, e.g., as described above, wherein a preprocessor, also called a normalizer, normalizes or otherwise processes each image to a constant pixel width and height so distant faces are normalized with image processing to a preselected size and very large faces close to the camera are also reduced to the preselected size.

Further aspects of the invention provide a system, e.g., as described above, wherein a recognizer takes one of more normalized images of preselected sizes and compares the normalized images against each POI entry. as described above, wherein a recognizer takes one or more normalized images of preselected sizes and compares the normalized images against each POI entry. If there are multiple POI images for each individual, each POI image is compared, and a confidence score is calculated and entered in the confidence listing.

Further aspects of this invention provide a system, e.g., as described above, in which the tracker selects video frames in which to recognize faces (i.e., as belonging to a same individual from a previous frame or to an individual new to the video stream) based on pose, detected object size, blur and measures of noise and, thereby, increases the overall probability of correct identification.

Still further aspects of the invention provide a system, e.g., as described above, in which the tracker integrates facial identification results over time, thereby, still further increasing the probability of correct identification.

Further aspects of the invention provide a system, e.g., as described above, wherein a match publishing module not only tabulates all the confidence levels, but also prepares to publish the matches to the server above a certain threshold level set prior to the system operation.

Still further aspects of the invention provide methods paralleling one or more of the operations described above.

Related aspects of the invention provide such methods suitable to run at real time or near real time, e.g., on a combination of CPUs and GPUs.

Yet still other aspects of the invention of evident in the description, drawings and claims that follow.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
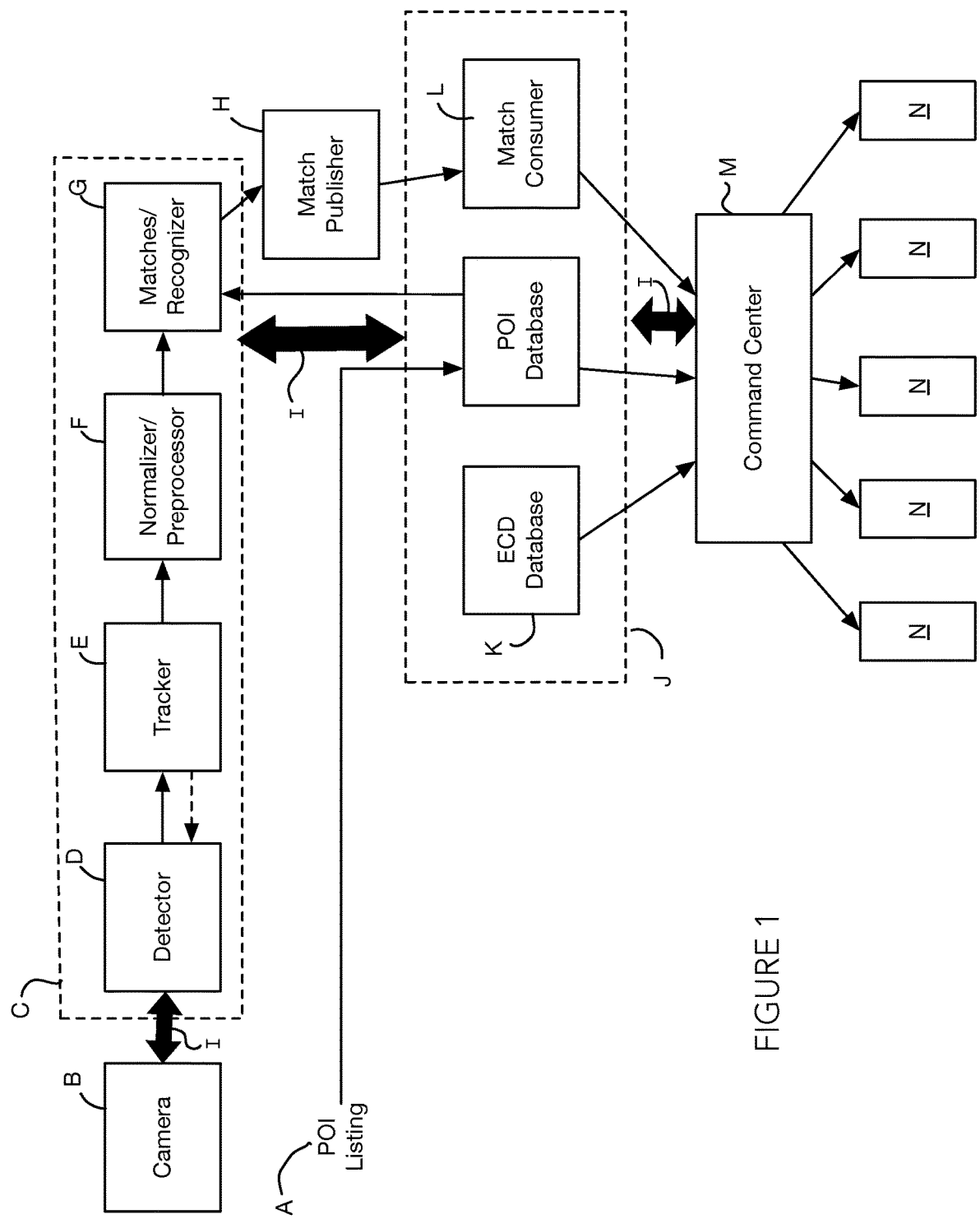
FIG. 1 shows a schematic view of a facial recognition method and system in accordance with the present invention.

In FIG. 1 there is shown a system and method according to the invention which uses facial recognition, e.g., to exclude persons of interest from events and/or venues. The system and method comprise a combination of cameras, edge processing devices, servers that are coupled for communication (e.g., via a network or otherwise) and that may reside together on premise, remotely from one another and/or in the cloud to recognize persons of interest (POI) and interdict and prevent such POI from entering such events and/or venues.

Referring now to FIG. 1, the POI listing A comprises one or more images of a good likeness of each POI member. In the illustrated embodiment, it is contemplated that there are different classes of POI, such as the most dangerous POI named RedPOI who pose grave threat to fans at Venues, or YellowPOI, who might be considered medium risk and BluePOI for low risk, for instance. Other embodiments may vary in this regard.

The system comprises one or more cameras, here, represented by exemplary camera B, that capture the video feed of the crowds at the venues. The cameras B preferably match a) the lighting conditions, b) the resolution, and 3) speeds of video capture to allow acceptable video input, but it is not required. The cameras may be installed in areas where security checks at entrances are occurring, but also may be installed in any appropriate areas to cover a large area sufficiently well. When physical interdiction is required the density of the camera provides a manageable area for the security personnel to locate the POI detected.

Each camera B comprises a conventional video or still image capture device of the type available in the marketplace suitable for acquiring image of persons and other things as adapted in accord with the teachings hereof. In the illustrated embodiment, camera B is a conventional security camera, though, in other embodiments it may be a special purpose camera of conventional or proprietary construction. And, although, only one camera B is shown in the drawing, in typical embodiments multiple cameras may be used.

Each camera B is processed by a video processing software module, typically running on an edge computing device (ECD) C. In some embodiments, one such device C is coupled to each camera B, as shown in the drawing, for purposes of processing a video stream generated by it; although, in other embodiments, a device C may be coupled to and service multiple such cameras B in such fashion.

The camera module B, which can be considered part of the Detector D serves to capture video per convention in the art as adapted in accord with the teachings hereof. For example, it can capture a h.264 video stream from a network camera transmitted using the real time stream protocol (RTSP). It can also buffer frames in a manner to make a threaded program be able to access them without creating errors. Other embodiments may, of course, vary in the aforesaid regards. A further appreciation of the features and operations of Detector D, including image acquisition via camera B, may be attained by reference to the source code and embedded comments for the module the VideoStreamDataSource, below.

Edge computing devices C can be situated in a vicinity, e.g., as the same facility, event location or other locale, as the respective camera(s) B to which it is coupled, as suggested in the drawing. In such instances, coupling can be attained by direct connection (i.e., from the camera(s) to port(s) of the device C) or by network connection, wired, wireless or otherwise. Alternatively, one or more devices C can be located remotely from its respective camera(s) B and coupled via a suitable network or other connection, all as is within the ken of those skilled in the art in view of the teachings hereof.

ECD C maintains a local listing (or store or database) of the one or more POI listings. The ECD C takes the continuous stream of video coming from the camera connected to the ECD C, starts processing that stream and matches it against the POI, reporting matches to the MatchConsumer L. The ECD may be implemented on a personal computer, workstation or other computing device, of general- or special-purpose, of the type known in the art as adapted in accord with the teachings hereof. The programming of such general- or special-purpose device to effect the operations attributable the ECD and components thereof shown and described here is within the ken of those skilled in the art in view of the teachings hereof.

Depending on how much processing power is available at the ECD C it is possible to take multiple streams of video from multiple cameras B. In the illustrated implementation, there is a one-to-one mapping of the camera B to an ECD C. There are multiple software modules running on the ECD C which together form the processing unit for facial detection.

Illustrated detector D, is tasked with detecting a particular image, in this particular case a face. The detector D takes each frame of the video stream and with algorithms it is loaded with (one preferred example is an MTCNN algorithm), will detect all faces in the frame, will mark each face in a particular way, will also give each face a unique ID (also called faceID) and will also isolate the face image from the rest of the frame. It may also yield facial landmarks, such as the tip of the nose, right and left corner of the mouth, and the centers of the two eyes. Other embodiments may vary in the aforesaid regards. A further appreciation of the features and operations of Detector D may be attained by reference to the source code and embedded comments for the classes FaceDetector and FaceDetectorMtcnn, below. Note that in some embodiments, a body detector, also called a person detector, may be used instead of, or in addition to, a face detector to aid the tracker to continue tracking a person when the person when a face is not visible to the camera.

Figure 3:
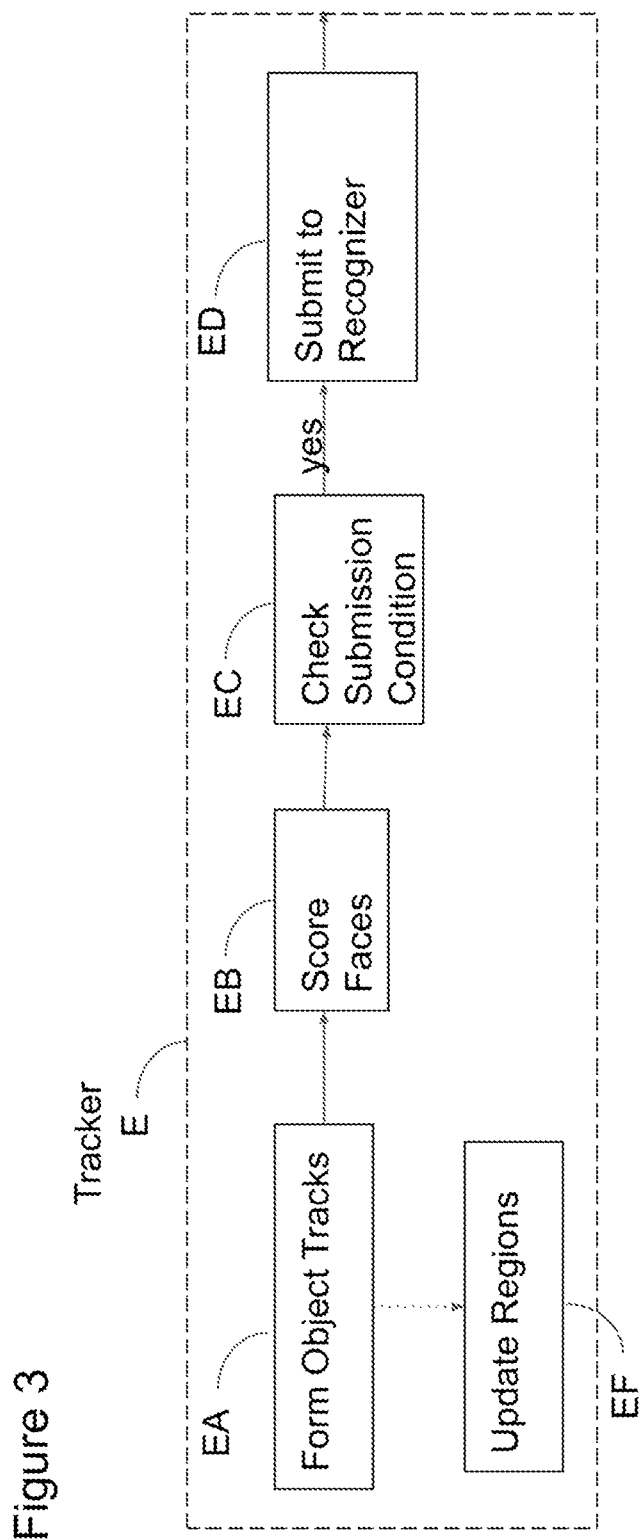
FIG. 3 shows a schematic view of tracker logic in the system of FIG. 1.

The tracker E tracks each face from frame to frame in the video stream. The purpose of this feature is if people are walking or moving around the tracker needs to recognize that the face is either the same face or new entrant into the frame (which is left for the detector to mark with a unique ID). The result is a track, which is an array of cropped images of faces to be interpreted by the Recognizer Module G, as well as other information such as the timestamps, and/or facial landmarks. Other embodiments may vary in the aforesaid regards. A further appreciation of the features and operations of tracker E may be attained by reference to the source code and embedded comments for the modules FaceTracker and MultiFaceTracker below. Further details on the operation of a Tracker of the illustrated embodiment is shown in FIG. 3 and described below.

The VideoPreprocessor (below) orchestrates the operation and co-operation of Detector D and Tracker E. It takes in a video source, finds faces, tracks the faces, and produces a groups of tracks.

The Normalizer (also called a Preprocessor) F preprocesses the face for the algorithm that will process the face into a vector, including resolution, color encoding (e.g. Blue Green Red: BGR), and the range of the pixels (e.g. 0 . . . 1 or 0 . . . 255). Without limitation, it starts by resizing each image to a constant pre-selected pixel width and height, such as 160 pixels×160 pixels, though other sizes are also contemplated, so distant faces which may be only a few pixels wide and high will be normalized with image processing to the preselected size (e.g., 160×160 pixels) and larger faces, such as those close to the camera are reduced to the preselected size (160×160 pixels) as well. Other embodiments may vary in the aforesaid regards. A further appreciation of the features and operations of normalizer F may be attained by reference to the source code and embedded comments for ResNet50_128D_FaceEmbedder (an instance of the FaceEmbedder) below. In the embodiment below, the ResNet50_128D_FaceEmbedder subtracts off a value (91.4953, 103.8827, 131.0912) to prepare the face for the embedding algorithm, which takes the face and produces a vector.

Recognizer G takes each preprocessed image, produced by the normalizer, and compares this normalized image against each POI entry. If there are multiple POI images for each individual, each POI image is compared and a confidence score is calculated and entered in the confidence listing—close to 100% confidence suggests the detector found 100% match of the preselected size image with the POI image and 0% means a definite non-match. The confidence level is the mechanism which suggests a close match or a poor match of fans/visitors with the POI listing. Other embodiments may vary in these regards. The recognizer is further described in FIG. 2.

The MatchPublisher H, which not only tabulates all the confidence levels, but also prepares to publish the matches to the server J, described below, above a certain threshold level set prior to the system operation. For instance, in one form of the invention a strict system may be set with a low confidence level such as 55%, but a very strict matching system may choose to only evaluate matches with confidence levels of 95% or better. MatchPublisher H keeps the image and the faceID for all matches above the confidence levels; the rest of the matches and associated data are preferably deleted to preserve storage capacity in the ECD C and also to preserve the privacy of the people in the crowd that pose no security threat. An instantiation of the Match-Publisher is the AlertingIdentifier (detailed in the source code listings and embedded comments below). The alerting identifier uses a FaceSequenceMatcher (detailed in the source code listings and embedded comments below) to decide if the track (or sequence) of faces matchers with a POI. The FaceSequenceMacher can compute the similarity of every image in the sequence with a POI, and compute an average similarity, and then check the threshold to decide if there is a match. If indeed there is a match, the largest similarity face and score is reported to the server J.

In practice, various methods are used to increase the effectiveness of the MatchPublisher. A first is to not send repeated alerts. For the instantiation of the AlertingIdentifier: it checks to see if a match has been made within a time interval. If so, it does not repeat the alert. A second is the concept of the special watch list. If the system makes an error, and an alert is sent to devices (N) incorrectly, then it is like to repeat the same error when the same person is seen later. To avoid repeated errors, a face (embedding vector) that is consistently incorrectly matched, can be recorded and effectively added as a special POIs. When subsequent examples of the same person are matched, and match the special POI, they can be ignored. A simple way to implement this functionality is to have the server J message the ECD C to add the person who is in error as a POI. Subsequent images of that person are likely to match to him or herself. When the server receives an alert for that special POI, the server can simply ignore it. Thus, repeated incorrect alerts can be avoided.

The ECD C is connected to it server J, either on the same LAN or in the Cloud via a network I, which may comprise one or more networks of the type known in the art suitable for transmission of images and/or other information of the type described herein. In some cases there may be more than one server J on the LAN, in the Cloud, or a mixture to maintain redundancy and speed. The server J fulfills a number of functions. First, it holds the POI database which is ingested prior to the system operation or is added to during operation and a copy is disseminated to each ECD C. The POI Database needs to be sent to each ECD C. In practice, the images are not sent to keep the images of POI contained on a server. Only the embeddings from each image is sent, which can be created using the FaceEmbedder (below). And, that creates a challenge for when the algorithm to produce embeddings is updated, new vectors much be transmitted to each box. To solve this issue, the ECD C are updated first with the new algorithms, and then the POI vectors are re-downloaded. The algorithm is specified with the POI vectors. An instantiation of such a label is the EmbedderNames (detailed in the source code listings and embedded comments below).

The server) is aware of all the ECDs C and stores the in a database K. It may also be aware of their physical location. When commissioning a camera (B) and an ECD (C) associated with it, the location and perhaps desired confidence levels of detection should preferably be noted in the server (J).

The server (J) is aware of the health of each camera/ECD pair and will engage in a constant heartbeat message coming from the ECD (C). The purpose of the ECD-initiated heartbeat (and potential conversation with the server) is so that the ECD (C), which may be located inside a firewall, may connect from the inside and report quickly its status and also potential hits of high confidence levels quickly. The heartbeat rate may be made very quickly to create a very responsive system to manage a very large crowd detection or relatively slowly to minimize network bandwidth in areas where bandwidth might be difficult or expensive, such as remote areas served only by satellite phones.

In the field, cameras (B) fail in a number of ways for which the heartbeat is key. The frame rate can go to 0. The resolution can drop. The video can fail and deliver noise. The heartbeat can indicate framerate, as well as the number of faces detected during the last period. In practice, the Server (J) can have alerts set so that when number go below and above thresholds, the management team on site (holding devices N) can get messages from the command center (M) indicating problems. An instantiation of given by the HealthChecker (below). Data is collected and send to the Healthchecker, and periodically sent to the server. On the server side, (J), the CloudWatchSensorObserver (below) receives the data, and in combination of Amazon Web Services (AWS) Cloudwatch, alerts can be set which then send alerts to devices N the infrastructure team to investigate a problem.

In the illustrated embodiment, the server can feed alerts, e.g., to command center M for display on devices N indicating the presence and locations of all known threats, defined by the presence of matches of faces from the crowd of the POI listing with a confidence level above the defined threshold. Such alerts can be in the form of audio alarms, visual signals or otherwise, as is within the ken of those skilled in the art in view of the teachings hereof. Alternatively, or in addition the server can send to the command center M (and, in turn, to devices N) a version of the video stream modified to highlight—e.g., via arrows, circles, or other graphical devices, and/or via increased brightness, contrast or other video techniques known in in the art, those threats. The feeding of such alerts and modification of such video streams is within the ken of those skilled in the art in view of the teachings hereof.

The server (J) keeps the aggregate of all the matches of POI by running a MatchConsumer (L) module which listens to the MatchProducer module in each of the ECD (C). Since people and POI may be moving around, the server (J) feeds a central or distributed display system which may be in a control center or command center (M). In addition, relevant match information may also be passed to security personnel and their handheld devices near each camera B. The display and the handheld devices may show the location, the face from the crowd that was matched with the POI listing and the confidence level of the match. The network of devices N receiving the information may be carried by security personnel to interdict the matched individual in the crowd and take further security action, thus keeping the fans in the Venue safe.

An additional step occurs during the adding of POIs. Some images may be rejected because they are blurry. Other images may have low quality that may not be so easily detectable. One method to find these images is to compare against the embedding vectors of other POIs. Images that are too similar are rejected. An instantiation of this method is found in the detect_duplicates function of the Classifier method below.

Configurable Confidence Score: The Recognizer G's use of confidence scores to determine when the quality of the image of a tracked face improves enough (becoming less occluded, for instance) to be re-scrutinized by the recognition module, thereby improving the accuracy of the system, makes the system very reliable and usable for this purpose. In addition, each camera/ECD pair may be assigned a different confidence threshold which might be necessary due to ambient lighting conditions or position of the camera (which may not always be optimal due to external factors). To achieve this ability, Server (K) communicates to ECD (C), updated thresholds.

Figure 2:
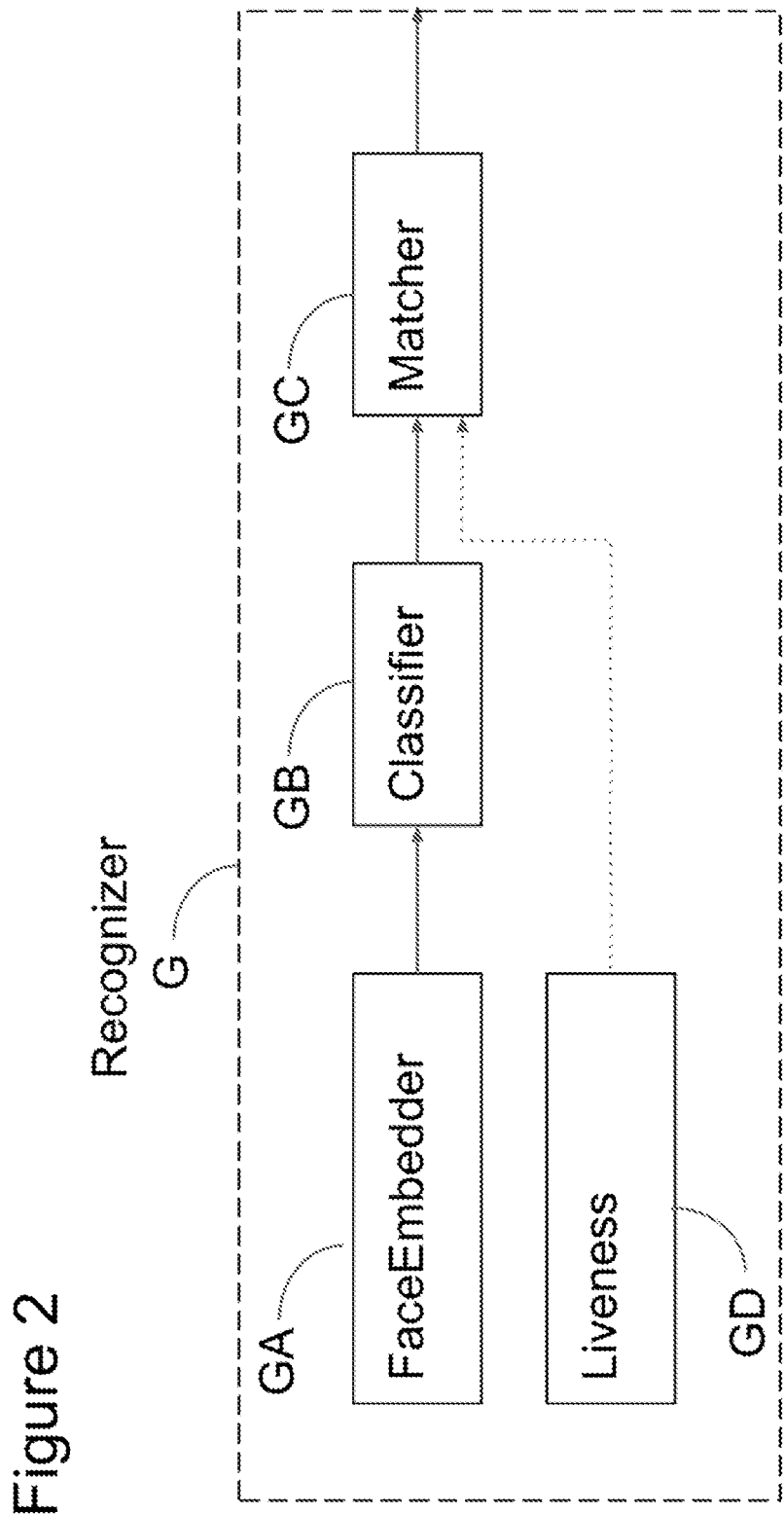
FIG. 2 shows a schematic view of recognizer logic in the system of FIG. 1.

FIG. 2 shows a schematic view of an implementation according to one practice of the invention of the Recognizer, G from FIG. 1. It is also labeled G in this figure.

Illustrated Recognizer G uses the FaceEmbedder module GA (detailed in the source code listings and embedded comments below) to convert each face to a vector, and then a Classifier GB (detailed in the source code listings and embedded comments below) to find the similarity between the image and each POI. The CosineSimilarityClassifier (detailed in the source code listings and embedded comments below) uses the cosine metric between vectors, and can be used between vectors from POI images and vectors from collected images. If the similarity is high enough, a match is reported by the GC Matcher. In alternate embodiments, the Recognizer may use a support vector machine, or simple neural network, or other machine learning mechanism to classify vectors as belonging to a POI.

The confidence can be reported as a scaled number based on the similarity. An additional inter-POI-confidence can be reported based on the comparison of the similarity between the CosineSimilarity of the vectors from the collected images and vectors from POI images from different subjects in the POI. For example, the ratio of the top two subjects in the POI may be computed and additionally thresholded by the Matcher.

Also in FIG. 2 is optional liveness detection GD. This is provided to insure that pictures and other non-animate depictions do not trigger a match with faces of live individuals that are being tracked. The implementation of liveness detection is within the knowledge of those skilled in the art in view of the teachings hereof. Algorithms that check for liveness may also be used as input to the Matcher GC.

FIG. 3 is a schematic view of an implementation according to one practice of the invention of Tracker, 1E from FIG. 1. In EA, an object handed in by the Detector D is tracked in a conventional manner known in the art as adapted in accord with the teachings hereof. To this end, in some embodiments a KCF tracker is used because of it's speed. In other embodiments, a Kalman filter is used to predict where an object is going based on the apparent velocity of the object as depicted in the video stream (and as detected in accord with the teachings hereof and as modified in a manner within the ken of those skilled in the art). The result is object tracks which consist of cropped faces in time as described in FIG. 1. As the tracks are formed, the score for each face cropped face is computed in step EB. In some embodiments, the score consists of the inter-ocular distance in pixels, and the pose of the face, consistent of 2 angles in degrees. Modern face recognizers are more accurate for higher resolution images up to a minimum pixel width, and for faces that are closest to looking straight at the camera. In step EC, the illustrated system determines if it time to submit the track to the Recognizer. One creates a submission condition. In the illustrated embodiment, submission conditions check if the scores has stopped increasing, or if the track has existed for more than a certain amount of time. If the check for the submission condition is confirmed, the track of faces is submitted to the Recognizer G in step ED. Other embodiments may vary in these regards in the spirit of the invention.

Note that in the illustrated implementation, the tracker continues to track. It is an optimization not to submit the same person again to the recognizer. Note also the tracker has two failure modes. It can combine the tracks of two different people. It can also lose a track. Losing a track is not too difficult a problem as the Matcher GC in FIG. 2, can look at recent submissions and see if the person being submitted has already been submitted recently. It is equivalent of a temporary POI list. If two tracks are merged, that can create a problem for the Recognizer. The Recognizer then receives a list of crops that consist of at least 2 different people. This problem can be dealt with in two ways. First, the problem can be ameliorated. Trackers can be augmented with feature data such Linear Binary Patterns (LBP) around landmarks such as the ears, eyes, nose and mouth. The tracker can therefore be strengthened to only track objects which continue to have similar features, making it less likely that mistakes are made. Similarly, trackers can try to disambiguate tracks based on their motion and position. Second, one can run a clustering algorithm in the Recognizer. If the embeddings form two separate clusters, the Recognizer can effectively determine that it has two different faces. Note that taking into account the time values associated with the collected faces is valuable as one would expect the clusters would occur sequentially in time.

Figure 4:
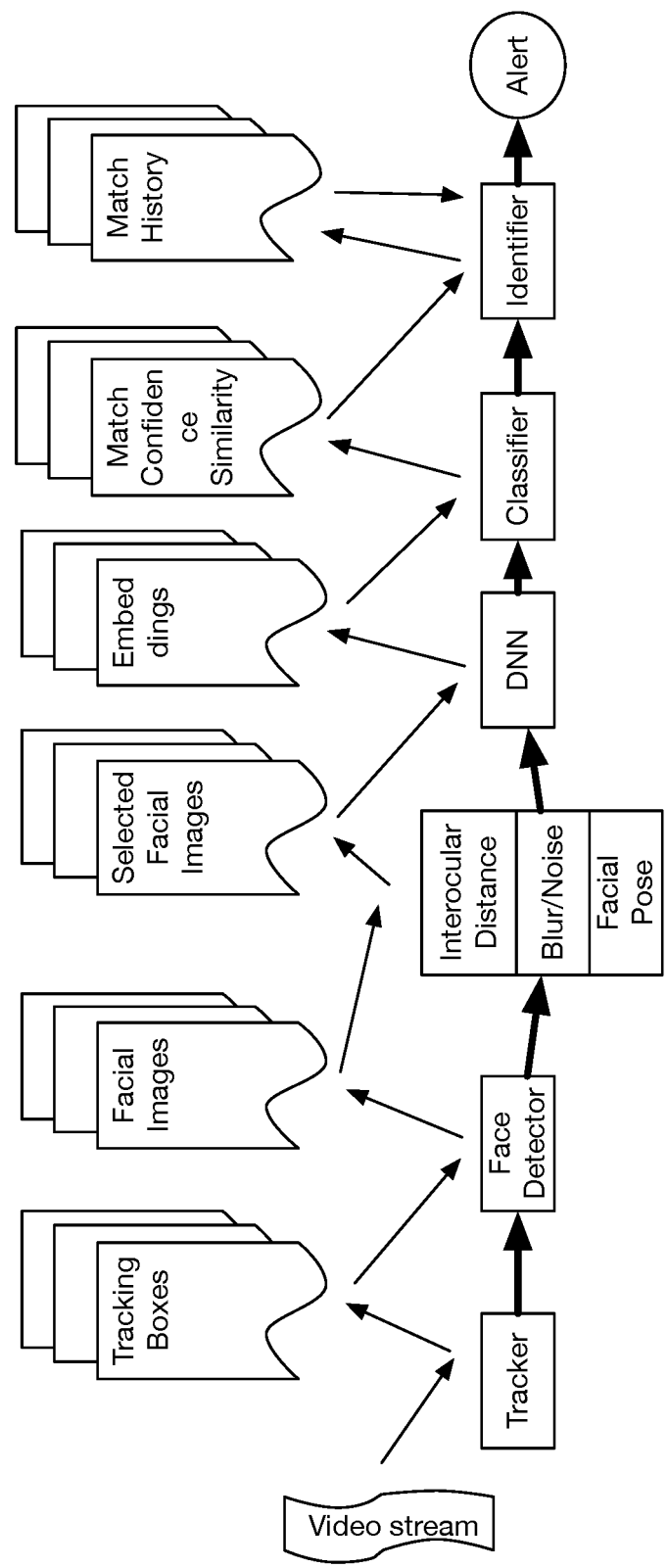
FIG. 4 shows an alternative schematic view of the facial recognition method and system of FIGS. 1-3.

The tracker can also be used to make a compute optimization in the object detector D in FIG. 1. Rather than have the object detector try to detect objects in the entire image, the object detector can be focused on the regions where tracks are located, or where new tracks are likely to appear. A simple way to do the optimization is to look for objects in the entire image, and then use the tracker for a few frames to predict new locations, and then look for objects in the entire image again, and repeat the cycle. A different optimization is to collect tracks over time, and map out the parts of the image that have faces. After enough time has passed, the object detector can look only in the used regions, rather than then the entire image, and occasionally look through the entire the entire image just to be sure. FIG. 4 is an alternative depiction of the invention, with changes in nomenclature with respect to FIG. 1, item C. The videoStream comes from the camera B in FIG. 1. The Face Detector (D in FIG. 1) detects faces. A preferred implementation is the MTCNN face detector, which uses deep learning networks to identify individual faces, and is a typical tool known to people with skill in the art of face detection. Each face is tracked by the Tracker (E in FIG. 1) over multiple frames thereby providing a temporal continuity. There are many trackers that will do; one example is a particle filter tracker, another is a KCF tracker. The Tracker forms tracking boxes, which are the cropped faces that come from a single person walking in view of a camera.

Each face in each frame is scored with respect to the amount of blur, noise, facial pose frontality, interocular distances as well as other sizes, and other factors (EB in FIG. 3). These factors are weighted to produce ultimate face score, which is used to select best faces from each tracking sequence thereby maximizing the probability of accurate facial identification. An example blur score is best on running high-spatial frequency digital filters over the image, and normalizing by the intensity and area. The higher the score, the less blurry the image. One can estimate a maximum blur by looking at many images which are not blurry. The pose can be measured as the pitch in degrees from facing the camera. The interocular distance can be measured in pixels. An overall score would simply be a normalized sum of these metrics: score=pose/(90 degrees)−blur/(maximum blur)+interocular distance/(100 pixels). The top score images are selected, which can be updated as the track continues (Part of Tracker E in FIG. 3).

Interocular distances that are too small yield very poor results, and interocular distances above a certain level yield no improvement. Therefore, in some embodiments, the score of a detected face is set to a constant value, such as 0, below a certain interocular distance, and then goes up linearly until a maximum interocular distance, at which point the score is set to 1. Note that the measure of interocular distance effectively includes a measure of the yaw-angle, because large yaw angles relative to the camera produce a small interocular distances. It is also a measure of the size of the face as small faces, which are harder to recognize, yield small interocular distances. In other embodiment, one can use width or height as the score, converted to a linear function truncated by a lower and higher threshold. Similarly, another way to compute score is to (i) truncate measurements of each of noise and blur to an expected and to normalizing the resultant values to lie between zero and one. The overall score can then be the product of the three scores, to wit, blur, noise and interocular distance. It will be appreciated that noise is often reasonably constant across within a camera, so that often noise is not computed.

The selected faces are sent to a DNN (which is an instantiation of a FaceEmbedder (GA in FIG. 2) such as Resnet34, a neural net, which produces a 256-dimensional vector of facial features (embeddings) for each face. The embeddings vectors for each face are used to compute cosine distances (similarity measures) in the Classifier (GB in FIG. 2) with each embedding vector previously produced for each photo to be identified with (watchlist or list of POIs). Due to cosine nature of similarity computation similarity measure falls between −1 and 1, "1" to be the most close resemblance. Each item in the watchlist is associated with a unique person id and has a unique photo_id These similarity measures are sorted to identify the two closest neighbors. The cosine similarities for the two closest neighbors are normalized to produce confidence measure in the range between 0 and 1, this is the inter-POI score. This is a per-frame portion of the classifier. The results of identification for each photo can include, the closest match person id, measure of similarity, confidence level. The Match Confidence/Similarity (GC in FIG. 2) can identify an individual as described above. The Identifier and Match History can be part of the Recognizer (1G) or the Match Publisher (1H). The preferred instatiation is in the Recognizer (1G).

One can do temporal adjustment of thresholds by processing more and more images over time. Out of multiple photos submitted for identification, the one with highest similarity level is selected and stored in the match history maintained for each person_id along with the timestamp. The match model analyze the match history to check if the identification activity for a given person id within a critical time (about 2 min) for a single episode exposure to the camera is sufficient to issue an alert (positive identification). The alert is issued if the average activity for a given person id over the critical time exceeds the thresholds for similarity and confidence. The similarity thresholds can be non-linearly adjusted (reduced) over the number of positive identifications within critical time period using the following formula:

$$Tadjusted = Tbase - Tstep \frac{1 - r^{(n-1)}}{1 - r}$$

Where Tadjusted is the threshold reduced from the original Tbase level over n positive identification within critical time period. Tstep and r are the parameters controlling the steepness of threshold adjustment. This formula is used for both the confidence and similarity thresholds. Once the alert is issued the match history and the thresholds for a given person_id are reset.

Using the Tracker (FIG. 1E) to Optimize the Recognizer (FIG. 1G)

Tracking a face on the video allows a method to associate a single person with multiple video frames. The number of times the embedder is run can thus be reduced. Instead of running the embedder on every frame, it can be run on a single frame or a small number of frames for each person. The embedder is often computationally expensive, so that reducing the number of calls to the embedder is valuable for efficiency.

Ideally one merely needs one facial image to make positive identification. Selection of a facial image from this sequence can increase the probability of accurate identification would depend on it. The invention includes a number of factors which allow one to maximize the accuracy of identification including but not limited to: Interocular distance; Pose of the face, including how close to straight at the camera; Blurriness of facial image; and Noisiness of facial image. These factors contribute to the facial image quality score, ultimately determining the image to be submitted for identification.

A preferred score for resolution goes from 0 to 1. The score is 0 below a minimum face width (or alternatively interocular distance). The score grows linearly to a 1.0 at a maximum interocular distance. Similarly a score for pose of the face based on the yaw angle which is 1.0 below. (We find that most captured faces have a small enough roll and pitch so as not to be worth computing as part of the score.) One way to compute the overall score is to take the product of the scores.

Submitting multiple selected frames from a tracking sequence further increases the probability of accurate positive identification. A preferred way to handle multiple input images is to pre-process all of them individually (FIG. 1F), and then feed them all through the Embedder (GA in FIG. 2). Processing multiple images can be done very efficiently on a graphics processor (GPU), or a CPU with many cores. The classifier (GB in FIG. 2) can then also process the images individually. The Matcher (GC in FIG. 2) can run a number of algorithms based on the outputs of the classifier for each image.

In a preferred instantiation, The matcher considers the cosine similarity score for each image and the top POI match, as well as the inter-POI-confidence. If the inter-POI confidence is too low, that face-crop is ignored.

Because the tracker makes errors and sometimes merges tracks of different people, it is possible that two people walking are part of a track. For the security application, it is unlikely that multiple POIs will be present together and be part of a confused track. And, there is a likelihood that another camera will see the same person later on. Thus, a preferred approach is that using the detected faces in a track, the Recognizer recognizes only one person. Of the remaining matches, if the cosine similarity score is high enough for any one POI, and no other POI, then that match is approved.

As mentioned previously, clustering algorithms can also be used to separate out embeddings of two different people in the same track, in which case each cluster of embeddings can be treated separately.

Otherwise, the threshold of cosine similarity score can be lowered linearly from that higher threshold to a lower threshold based on the number of images available, as long as all the images vote for the same person. As an example, if top POI match is the same for five images, and they all have a score above the lowered-threshold, then a match is found. Furthermore, there can be made an effective 1-match, 2-match, 3-match, etc. threshold. Is the example, if three of the five images are above the 3-match threshold, then a match is made.

Theory of Using Multiple Images to Increase the Probability of Positive Identification Given a sample x from a rate, we have 2 hypotheses: Hypothesis A: The image is of the person on the watchlist whose embedding is closest to Hypothesis B: The image is from anyone else, either on the watchlist or off. There are N people at the event, perhaps 50,000. There are M people whose embedding is reasonably close to the embeddings of A.

Theory with a single sample: Given a sample embedding x. Assume the measured numbers are: $p(x|A)=0.4, p(x|B)=0.1$ $p(A|x)=p(x|A)p(A)/p(x)$
  $p(A)=1/N$
  $p(x|A)=0.4$
  $p(x)=p(x|A)p(A)+p(x|B)p(B)=0.4/N+0.1*N/(N-1)$
  $p(A|x)=0.4/(0.4+0.1*(N-1))$
  $p(B|x)=0.1*(N-1)/(0.4+0.1*(N-1))$ Note that if N is large, the tail of the probability distribution is strengthened by N−1. In practice, we typically only care about the M people whose embeddings are close to the embedding of A. In practice, M is proportional to N, with a small coefficient. So, the above theory should really have (M−1) in it, not (N−1). If $p(A|x)$ is much larger than $p(B|x)$, the false positive rate is essentially 0, and we have very high confidence that hypothesis A is correct. If $p(B|x)$ is much larger than $p(A|x)$, the false negative rate is essentially 0, and we have very high confidence that hypothesis B is correct. Note that we are really working with probability densities above, but in practice one uses histograms. Measured histograms of distances within a class and across a class show a broadly peeked functions which can be approximately by a Gaussian distribution Theory with a multiple samples: Given a sample embedding x,y.

$p(A|x,y)=p(x,y|A)p(A)/p(x,y)$

If we assume the samples are independent given the hypothesis. (In fact, they are highly correlated)

$p(A|x,y)=p(x|A)*p(y|A)p(A)/[p(x|A)*p(y|A)p(A)+p(x|B)*p(y|B)*p(B)]$
$p(B|x,y)=p(x|B)*p(y|A)p(B)/[p(x|A)*p(y|A)\quad p(A)+p(x|B)*p(y|B)*p(B)]$ Let's examine three situations:
(1) Two samples that are about the same in probability:
  (a) $p(x|A)=0.4, p(x|B)=OA, p(y|A)=0.4, p(y|B)=0.1$
  (b) $p(x, y|A)=0.4*0.4/[0.4*0.4+0.1*0.1*(N-1)]$
  (c) $p(x, y|B)=0.1*0.1*(N-1)/[0.4*0.4+0.1*0.1*(N-1)]$
  (d) For two samples, it becomes exponentially more likely that A is the hypothesis.
(2) $p(x|A)$ high, $p(y|A)$ in the middle.
  (a) $p(x|A)=0.9, p(x|B)=0.01, p(y|A)=0.4, p(Y|B)=0.1$,
  (b) $p(x,y|A)=0.4*0.9/[0.4*0.4+0.1*0.1*(N-1)]$
  (c) $p(x, y|B)=0.1*0.01*(N-1)/[0.4*0.9+0.1*0.01*(N-1)]$
  (d) In this case, the probability of B is super-tiny, and we can ignore it.
(3) $p(x|A)$ high, $p(y|B)$ in the middle.
  (a) This is the same as (2) above.

If the samples x,y, are independent conditioned on the hypothesis:
  More samples are exponentially better. One gets exponential improvements in the false positive and false negative rates.
  If any one sample is very high or low probability: The false positive and false negative rates are already sufficiently low to not require additional samples.
  The results are independent of the number of people in the watchlist. If the watchlist grows, the match doesn't change. If the number of people at the event grows, the math changes.

In practice, the samples are not independent conditioned on the hypothesis. But, in practice it is not a bad approximation as the embedder maps images to a region in a high-dimensional space, and with deep learning embedders, small perturbations in the input image can have random effects.

The implied algorithm Choices:
  Any match that is sufficiently high or low probability, make a decision.
  Measure the probability distributions within subjects and across subjects to estimate $p(x|A)$ and $p(x|B)$ based on the distance between embeddings. This should just be a histogram/look-up table.
  Use those distributions to estimate false positive and false negatives rates for a given sample. That is a measure of confidence.
  If desired, $p(x|A)$ can be measured independents for each member of the watchlist.
  One can do the same analysis using KNN classifier with K=2 to members of the watchlist.

In practice, the histogram/look up tables can be estimates, and replaced by a linear function, which is the preferred implementation.

Integrating Classifier Output Over Immediate Past for Making Identification Decisions Successive positive identifications reduce the probability of false positive, therefore our system reduces the thresholds for similarity and confidence over multiple identifications thereby making positive identification more probable. The threshold reduction is non-linearly dependent of a particular id being identified over a critical time window.

It's noteworthy that the thresholds used in the classifier in a single frame can be reduced based on using multiple frames and aggregating together and selecting the optimal frames to use. Thus the sampling discussed in the past section can be made to be optimal, looking for images that are most likely to give good answers, while reducing compute to fit within limitations. The compute reduction comes because not all images need to be investigated.

Example

A more complete understanding of the illustrated embodiment may be attained by reference to the code excerpts contained in the incorporated-by-reference ASCII file identified in the paragraph immediately below, in which code excerpts construction and operation of the modules shown in FIG. 1 is expressed in the Python programming language and comments embedded therein.

The computer program listing contained in the ASCII file named "SourceCode.txt", created Aug. 9, 2021, having a length of 24,521 bytes, submitted to the USPTO in compliance with MPEP 608.05 is incorporated by reference herein.

Described above and shown in the drawings are embodiments of the invention suitable for systems, apparatus and methods for digital data processing, digital image analysis, facial recognition, and/or computer-mediated security systems. Although some of the focus above is on systems and methods for facial recognition, e.g., for purposes of excluding persons of interest from public events and/or venues or otherwise, it will be appreciated that the teachings hereof maybe applied to other applications. By way of further example, although the edge detection device C and components thereof are described above as being used to process a single video, it will be appreciated that they may process multiple video stream, received simultaneously or otherwise, all within the scope of the teachings hereof. Moreover, it will be appreciated that the embodiments illustrated and described herein are merely examples of the invention and that other embodiments may incorporate changes to those described herein within the ken of those skilled in the art.

In view of the foregoing, what is claimed is:

1. A digital data processing method of identifying a person of interest in a video stream comprising executing, on a digital data processing system that includes one or more digital data processing devices that are in communications coupling with one another, the steps of
   A. detecting, using a detector and without using a facial recognizer, one or more faces in a video stream,
   B. using a tracker, and without using a facial recognizer, to associate one or more of the detected faces with a same apparent individual,
   C. scoring, without using a facial recognizer, each of the detected faces that are associated with the same apparent individual,
   D. applying selected ones of the scored detected faces of the same apparent individual to a facial recognizer to identify a person of interest, where selection is based on scores of the detected faces,
   E. wherein step (D) includes disambiguating among scored detected faces that are associated with the same apparent individual by clustering the scored detected faces into one or more clusters,
   F. wherein the clustering step includes using an embedder to map each of the scored detected faces associated with the same apparent individual to a respective vector of values,
   G. wherein step (D) includes utilizing the one or more clusters to identify scored detected faces associated with different individuals.

2. The digital data processing method of claim 1, comprising executing on the digital data processing system a step of modifying any of the video stream and a presentation thereof to highlight the person of interest.

3. The digital data processing method of claim 1, comprising executing on the digital data processing system a step of generating an alert regarding the person of interest.

4. The digital data processing method of claim 1, comprising executing on the digital data processing system a step of adjusting a threshold associated with the facial recognizer as a function of the number of selected images applied thereto.

5. The digital data processing method of claim 1, wherein step (D) comprises foregoing application to the facial recognizer of scored detected faces whose scores fall below a threshold.

6. The digital data processing method of claim 1, comprising executing on the digital data processing system a step of monitoring, over a continuous interval of time, scores of scored detected faces associated with the same apparent individual.

7. The digital data processing method of claim 6, wherein step (D) comprises applying to the facial recognizer one or more of the scored detected faces being monitored, if their monitored scores fail to increase within a specified period of time.

8. The digital data processing method of claim 7, wherein step (D) comprises applying to the facial recognizer one or more of the scored detected faces being monitored, if after the specified period of time their scores increase.

9. The digital data processing method of claim 1, wherein step (B) includes disambiguating detected faces to identify those associated with the same apparent individual.

10. The digital data processing method of claim 9, wherein step (B) includes disambiguating detected faces based on any of motion and/or position in fields of view captured by the video stream.

11. The digital data processing method of claim 10, wherein the step of disambiguating includes comparing features of the detected faces without using a facial recognizer.

12. The digital data processing method of claim 1, wherein step (D) includes utilizing time as a factor in clustering the selected detected faces to identify those associated with different individuals.

13. The digital data processing method of claim 12, wherein step (D) includes recognizing clusters sequentially in time.

14. A digital data processing method of identifying a person of interest in a video stream, comprising executing on a digital data processing system that includes one or more digital data processing devices that are in communications coupling with one another the steps of
   A. detecting, using a detector and without using a facial recognizer, a face of a first individual in a first video frame of a video stream,
   B. using a tracker to track, without using a facial recognizer, faces associated with the first individual detected in multiple frames of the video stream,
   C. scoring, without using a facial recognizer, each of the detected faces,
   D. selecting, based on scores of the detected faces, faces in the multiple frames apparently associated with the first individual, and applying those selected faces to a facial recognizer,
   E. using an embedder to map each face selected in the selecting step to a corresponding vector of numbers,
   F. clustering the corresponding vectors of numbers into one or more clusters,
   G. using the one or more clusters to identify selected faces associated with different individuals.

15. The digital data processing method of claim 14, comprising executing on the digital data processing system a step of adjusting a threshold associated with the facial recognizer as a function of the number of selected images applied thereto.

16. The digital data processing method of claim 14, wherein step (D) comprises foregoing application to the facial recognizer of scored detected faces whose scores fall below a threshold.

17. The digital data processing method of claim 14, comprising executing on the digital data processing system a step of monitoring, over a continuous interval of time, scores of scored detected faces associated with the same apparent individual.

18. The digital data processing method of claim 17, wherein step (D) comprises applying to the facial recognizer one or more of the scored detected faces being monitored, if their monitored scores fail to increase within a specified period of time.

19. The digital data processing method of claim 18, wherein step (D) comprises applying to the facial recognizer one or more of the scored detected faces being monitored, if after the specified period of time their scores increase.

20. A digital data processing method of identifying a person of interest in a video stream comprising executing, on a digital data processing system that includes one or more central processing units (CPUs) that are coupled to one or more graphics processing units (GPUs), the steps of
   A. detecting, using a detector and without using a facial recognizer, a face of a first individual in a first video frame of a video stream,
   B. using a tracker to track, without using a facial recognizer, faces associated with the first individual detected in multiple frames of the video stream,
   C. scoring, without using a facial recognizer, each of the detected faces,
   D. selecting based on scores of the detected faces in the multiple frames apparently associated with the first individual, and applying those selected faces to a facial recognizer,
   E. using an embedder to map each face selected in the selecting step to a corresponding vector of numbers,
   F. clustering the corresponding vectors of numbers into one or more clusters,
   G. using the one or more clusters to identify selected faces associated with different individuals,
      wherein, steps (A), (B) and (D) are executed on a said CPU and step (E) is executed on a said GPU.

21. The digital data processing method of claim 20, wherein said steps are executed on said digital data processing system to identify a person of interest in real time.

22. The digital data processing method of claim 20, wherein step (C) includes scoring the detected faces based on interocular distances.

* * * * *